United States Patent

[11] 3,523,555

| [72] | Inventor | Lawrence D. Padula<br>New Britain, Connecticut |
|---|---|---|
| [21] | Appl. No. | 652,810 |
| [22] | Filed | July 12, 1967 |
| [45] | Patented | Aug. 11, 1970 |
| [73] | Assignee | Skinner Precision Industries, Inc.<br>New Britain, Connecticut<br>a Corp. of Connecticut |

[54] SOLENOID CONTROLLED FOUR-WAY VALVE
4 Claims, 7 Drawing Figs.

[52] U.S. Cl. ................................................. 137/625.64
[51] Int. Cl. ........................................................ F16k 11/02
F16k 11/24
[50] Field of Search............................................137/625.63,
625.64, 625.69

[56] References Cited
UNITED STATES PATENTS

| 477,088 | 6/1892 | Von Mitzlaff | 137/625.69 |
|---|---|---|---|
| 2,861,592 | 11/1958 | Collins | 137/625.64 |
| 2,912,007 | 11/1959 | Johnson | 137/625.64X |
| 2,993,510 | 7/1961 | Collins | 137/625.64 |
| 3,126,915 | 3/1964 | Hunt | 137/625.64X |
| 3,215,158 | 11/1965 | Bass et al. | 137/625.69X |
| 3,270,776 | 9/1966 | Carls | 137/625.64 |
| 3,329,159 | 7/1967 | Herion | 137/625.63X |
| 2,852,948 | 9/1958 | Renick | 137/625.64X |
| 3,401,711 | 9/1968 | Kubilos | 137/625.63X |

*Primary Examiner*— Henry T. Klinksiek
*Attorney*—Prutzman, Hayes, Kalb and Chilton

ABSTRACT: Apparatus comprising a ported body having a chamber and a valve spool reciprocable therein, a piston reciprocable in the chamber and fixed at one end of the spool, a return spring in one end of the chamber engaging an opposite end of the spool, a solenoid actuated valve mounted on the body and having a fluid passage in communication with the chamber for selectively directing fluid against the piston in opposition to the spring, and a pilot channel formed in the body and connecting a supply port therein in constant communication with the fluid passage of the solenoid actuated valve and with said one end of the chamber.

Patented Aug. 11, 1970 3,523,555
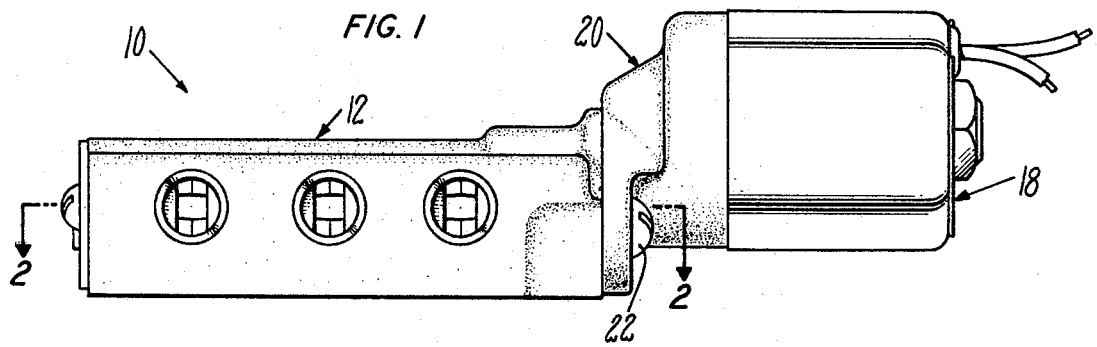
FIG. 1
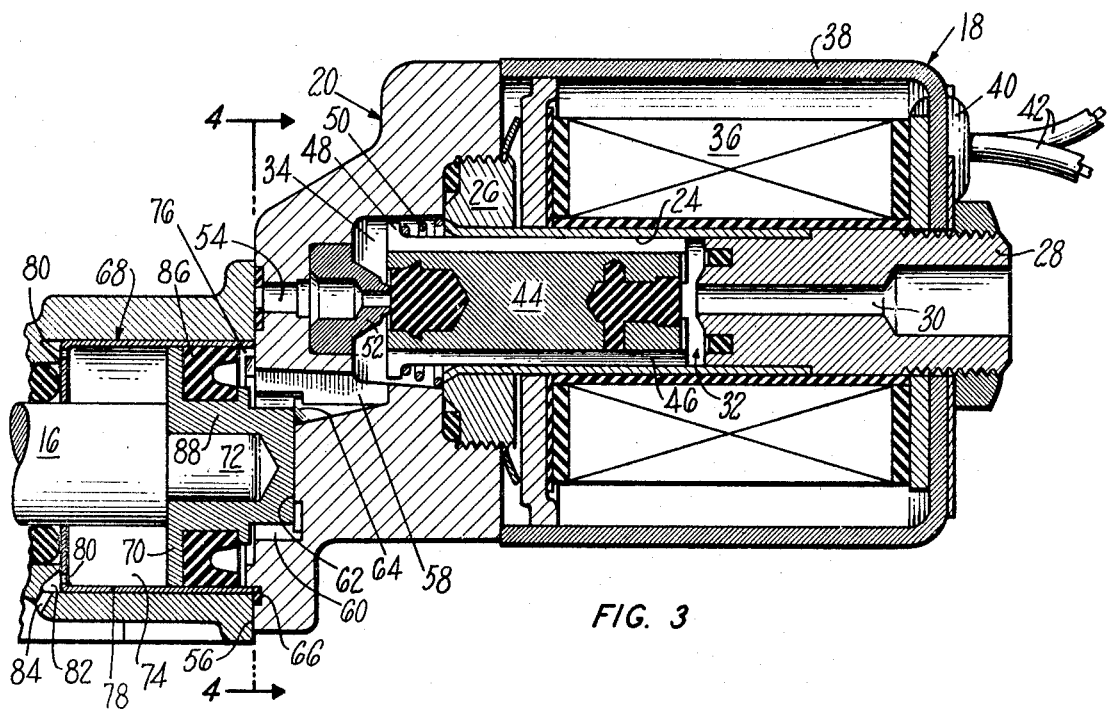
FIG. 3
FIG. 4
INVENTOR.
LAWRENCE D. PADULA
BY Lindsey, Prutzman and Hayes
ATTORNEYS

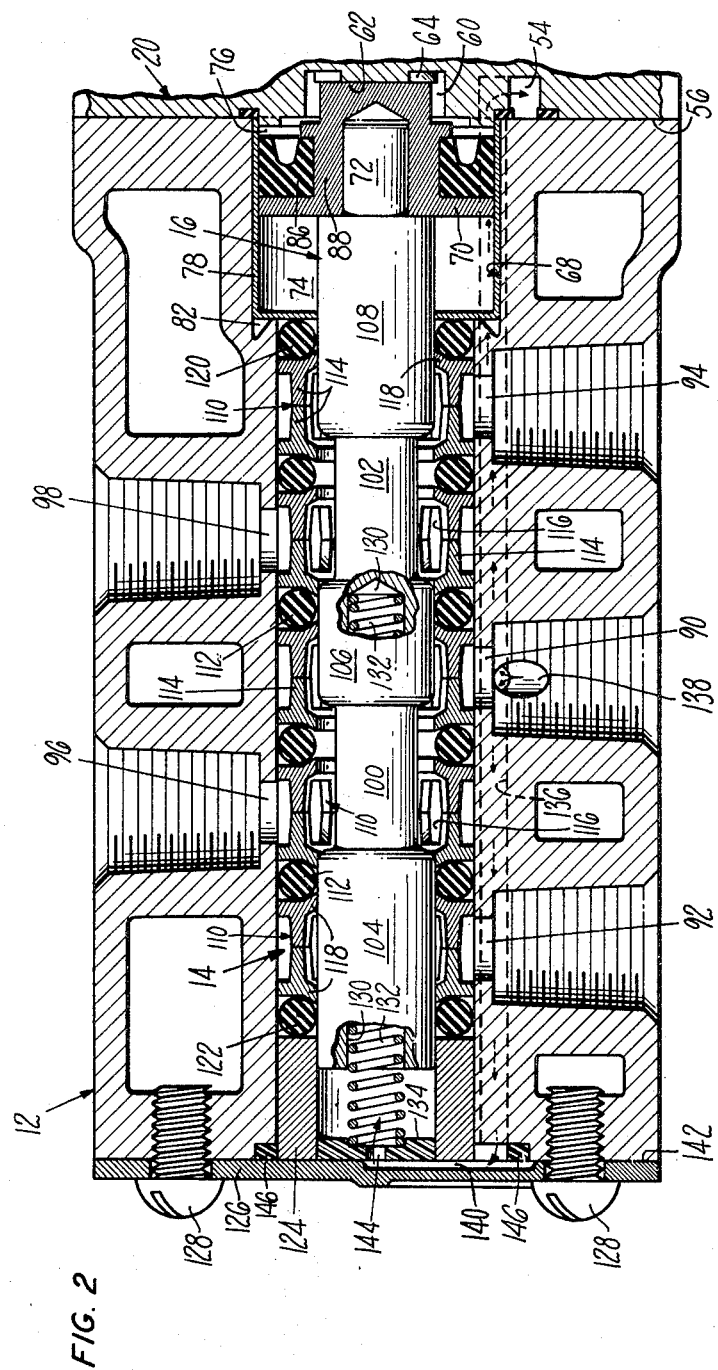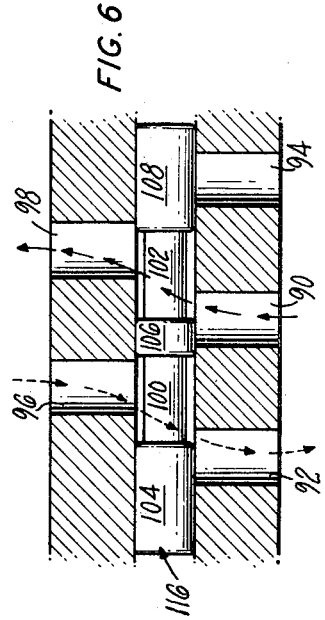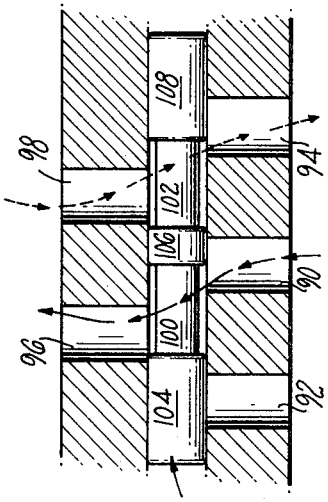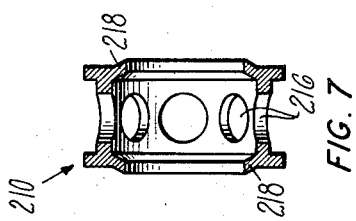

SOLENOID CONTROLLED FOUR-WAY VALVE

This invention generally relates to fluid valves and has as a primary object the provision of an improved solenoid controlled four-way valve of exceptionally compact, rugged construction.

Another object of this invention is to provide such a valve capable of reliable operation in positioning its valve member without stalling even though it is subjected to a wide range of sealing forces while regulating the flow of fluids under varying pressures.

A further object of this invention is to provide a valve of the above described type incorporating an improved self-restoring valve spool effecting minimal frictional resistance to movement.

Still another object of this invention is to provide an improved solenoid controlled four-way valve particularly suited for quick and easy assembly and installation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a side elevational view showing a preferred embodiment of a valve apparatus constructed in accordance with this invention;

FIG. 2 is an enlarged longitudinal section view, partly broken away, taken generally along line 2-2 of FIG. 1;

FIG. 3 is an enlarged longitudinal section view, partly broken away, showing a solenoid actuated valve incorporated in this invention;

FIG. 4 is a section view taken generally along line 4-4 of FIG. 3;

FIG. 5 is a partial longitudinal schematic view, on a reduced scale, showing fluid flow with the valve apparatus in a de-energized condition;

FIG. 6 is a view similar to FIG. 5 but with the valve apparatus in an energized condition; and FIG. 7 is a section view of an integral spacer cage embodied in this invention.

Referring now in detail to the drawings wherein a preferred embodiment of a valve apparatus 10 of this invention is illustrated, a generally rectangular valve body 12 is shown having a cylindrical valve chamber 14 wherein a valve spool 16, preferably formed of aluminum with a polished hardcoat surface, is received for axial reciprocating movement responsive to operation of a solenoid actuated pilot valve 18 of a type particularly suitable for use in this invention.

The solenoid valve 18 includes a base portion 20 shown secured by machine screws 22 to a rear or right hand end of the body 12 as viewed in the drawings. A sleeve 24 is secured to the base portion 20 by a threaded collar 26, and an outer end of the sleeve 24 has a nipple 28 fitted therein to provide an exhaust passage 30 for a chamber 32 jointly defined by the sleeve 24 and a compartment 34 formed in the base portion 20. The sleeve 24 is surrounded by a solenoid coil 36 enclosed by a housing portion 38 suitably secured to the base portion 20 and having a fitting 40 through which lead-in wires 42 for the coil 36 extend for connecting it to a suitable source of electrical power.

A reciprocable bi-positional armature 44 is received for sliding movement within the sleeve 24, and grooves 46 in the sides of the armature 44 facilitate free flow of fluid between the armature 44 and the sleeve 24. The armature 44 is shown having a radial end flange 48, and a compression spring 50 is seated between the flange 48 and an inner end of the sleeve 24 for biasing the armature 44 forwardly in the compartment 34 against an annular valve seat 52. The latter is apertured to connect with an arcuate groove 54 in an end wall 56 of the base portion 20 to jointly define an inlet passage to the compartment 34 which connects through a fluid passage 58 having an annulus 60 formed in the end wall 56 to surround a seat 62 shown having equally spaced, peripheral V shaped notches 64.

Upon mounting the base portion 20 onto the rear end of the body 12, a gasket 66 is preferably provided between their abutting surfaces to ensure against unintended fluid leakage. The annulus 60 is in continuous communication with an operating cylinder 68 formed by an enlarged rear diameter portion of the chamber 14 wherein an actuating piston 70 is shown fitted onto a stem 72 of the spool 16 and dividing the cylinder 68 into forward and rear compartments 74 and 76.

The cylinder 68 is defined by a cup-shaped liner 78 dimensioned to fit within the enlarged rear diameter portion of the chamber 14 and retained against axial movement by the base portion 20. In the specific illustrated embodiment, the liner 78 is apertured to receive the spool 16 and is of a unitary construction. Suitable bleed openings such as at 80 (FIG. 3) are formed in the liner 78 for exhausting trapped air ahead of the piston 70 through a circular groove 82 and a vent 84 formed in the body 12. While conventional valve construction normally provides for fabrication of parts from aluminum castings, the liner 78 is preferably formed of stainless steel for increased abrasion resistance as well as to virtually eliminate corrosion while minimizing any frictional resistance to piston movement.

To prevent fluid leakage between the forward and rear cylinder compartments 74 and 76 while accommodating manufacturing variations without close tolerance requirements, an annular U cup seal 86 is fitted about a neck 88 of the piston 70 to provide a self-centering piston and spool arrangement.

More specifically, the seal 86 is formed of a tough resilient material of C shaped half section opening toward the base portion 20. Upon directing fluid into the rear cylinder compartment 76 to drive the piston forward, the perimeter of the seal 86 expands radially outwardly against the liner 78, and upon return of the spool 16 with the rear cylinder compartment 76 vented to atmosphere through the exhaust passage 30, the force exerted by the U cup seal 86 upon the liner 78 approaches zero due to contraction of the seal 86, reducing the required return force which must be exerted on the spool 16. By virtue of the stainless steel construction of liner 78, a low friction surface is presented to the seal 86, further minimizing frictional resistance to spool movement.

Referring now to the body 12, five ports are shown communicating with the chamber 14. The ports are alternately disposed along the length of the chamber 14 with a central inlet port 90 formed on one side of the chamber 14 between two exhaust ports 92 and 94 respectively servicing two working ports 96 and 98 formed on the opposite side of the chamber 14.

While spools of different construction can selectively effect proper intercommunication between ports, the spool 16 of the preferred embodiment has a pair of axially spaced grooves 100, 102 defining three separate lands 104, 106 and 108 suitably dimensioned and spaced apart for alternately connecting the inlet port 90 to one of the working ports 96, 98 and exhausting the other through its respective exhaust port in accordance with the axial positioning of the spool 16.

To ensure proper fluid flow between ports as determined by the spool position, a sealing subassembly is mounted within the chamber 14 for engaging the spool lands and providing an effective perimeter seal between the spool 16 and the body 12 surrounding the chamber 14.

The sealing subassembly includes a plurality of annular spacer cages 110, corresponding in number to the ports, which are coaxially fitted within the chamber 14 about the spool 16 with each cage 110 radially aligned with one of the ports for retaining O ring seals 112 in separated coaxial placement within the chamber 14 for independent sealing engagement with the spool 16. To effect economies in manufacture as well as to facilitate its assembly, installation and replacement, the sealing subassembly may be coupled together by mere abutment and end clamping of parts. The cages 110 respectively comprise a pair of annular mating members each having circumferentially spaced arcuate legs 114 axially extending toward the legs of its mating member for abutting engagement. It will be understood that the abutting terminal portions of each of the legs 114 are of a sufficient size greater than the chordal distance between adjacent legs to prevent telescoping of the mating members.

The mating members of each cage 110 thereby jointly define a plurality of radial openings 116 aligned with its respective port, and inner peripheral shoulders 118 of the mating members of each cage 110 flare axially outwardly in opposite directions for cooperating with an adjacent cage 110 to secure an interposed O ring 112 against movement with the inner peripheral shoulders 118 of adjacent cages 110 being spaced apart a distance less than the O ring diameter. The springs 120, 122 are also secured at extreme right and left hand ends of the sealing subassembly so as to be retained in abutment respectively against the aforementioned liner 78 and a bushing 124. To assist in maintaining proper centering of the spool 16, the bushing 124 is of sufficient length to surround a left hand end portion of the spool 16, irrespective of its position, and is retained by an end plate 126 removably secured to the body 12 by machine screws 128, whereby the sealing subassembly is merely clamped in abutting relation to provide effective sealing between the spool lands and the chamber walls under high pressure fluid flow, without requiring any other retaining members.

If desired, integral spacer cages 210 (FIG. 7) can be used in place of the two piece spacer cages 110. The spacer cage 210 is preferably formed as a machined part of suitable aluminum alloy and is provided with radial openings 216 and inner peripheral shoulders 218 similar in construction and function to the corresponding portions of the above described cage 110.

The left hand end portion of the spool 16 has an internal axial end opening 130 and a return compression spring 132 seats against a retaining ring 134, fitted inside the bushing 124 in engagement with the end plate 126, and extends into the end opening 130 for continuously applying a biasing force to the spool 16 urging its piston 70 into engagement with the previously mentioned seat 62 provided by the base portion 20 of the solenoid valve 18.

The spring 132 is designed to provide a biasing force sufficient to urge the spool 16 into its illustrated right hand flow position at a minimum operating pressure, but since frictional resistance to spool movement exerted on the spool lands 104, 106 and 108 by the exposed O rings increases with increasing fluid pressures within the chamber 14, objectionable spool stalling is normally encountered with high pressure fluid transfer.

To ensure against spool stalling, irrespective of the pressure of the fluids being transferred, while also providing a motive pressure fluid to the solenoid valve 18, an elongated, permanently open pilot pressure channel, shown in broken lines at 136 in FIG. 2, is formed in the body 12 communicating with the inlet port 90 through an orifice 138 for independently supplying fluid at maximum line pressure to the inlet passage of the solenoid valve 18 as well as to the spring chamber portion of the body 12.

Specifically, one end of the pilot channel 136 registers with the arcuate groove 54 in the end wall 56 of the base portion 20 for supplying motive fluid to its inlet passage for activating the piston 70, and an indentation 140 is formed in an inside face 142 of the end plate 126 connecting an opposite end of the pilot channel 136 to the spring chamber portion of the body 12 through a central aperture 144 in the retaining ring 134. A suitable sealing member 146 is shown fixed between the body 12 and its end plate 126 to prevent undesired fluid leakage to atmosphere from the pilot channel 136. The above described construction thus provides a constant rate fluid assist to the spring 132 exerting a positive return fluid bias on the spool 16 proportional to the pressure level of the fluid supplied to the inlet port 90.

While it is believed that the operation of the valve apparatus 10 will be apparent from the foregoing description, the following brief summary of operation may be helpful in fully understanding this invention.

The ports of the body 12 are connected for operation by suitable couplings, not shown, with fluid at line pressure being directed via the orifice 138 and pilot channel 136 to the spring chamber portion of the body 12 and inlet passage of the base portion 20 of the solenoid valve 18.

With the coil 36 in its de-energized condition, the armature 44 normally engages the valve seat 52, thus closing the inlet passage in the base portion 20 to the rear cylinder compartment 76, and the spool 16 is maintained in its normal right hand position wherein the piston 70 engages seat 62 such that working port 96 is connected to the inlet port 90 and working port 98 is open to its exhaust port 94 as clearly seen in FIG. 5. Upon energizing the coil 36, the armature 44 moves rearwardly to close the exhaust passage 30 and open the inlet passage to the fluid passage 58, establishing communication between the pilot channel 136 and the rear cylinder compartment 76. The piston 72 is then thrust forward under differential pressure due to its relatively large size against the force of the return spring 132 and the full line supply pressure within the spring chamber, and air ahead of the piston 70 vents to atmosphere from the forward cylinder compartment 74, thereby to shift the spool 16 into its left hand position to introduce fluid into working port 98 and exhaust working port 96 through its exhaust port 92 (FIG. 6).

It will be seen that the operating fluid pressure in the spring chamber is at a maximum substantially corresponding to the full line supply pressure and effects a fluid cushion for the spool 16 upon being shifted into its left hand position against the retaining ring 134 which acts as a snubber to absorb impact of the spool 16 as well as to maintain spring 132 coaxially centered within the spring chamber.

Upon de-energizing the coil 36, the armature 44 returns under spring force into its normal illustrated position thereby closing off the inlet passage to the rear cylinder compartment 76 and venting it to atmosphere through the exhaust passage 30 to effect automatic spool return under the influence of the spring 132 with the assistance of the return fluid bias.

The valve apparatus 10 effects reliable spool positioning at any pressure within the design limits without danger of objectionable stalling even during transfer of high pressure fluids. Moreover, the valve apparatus 10 is provided in an exceptionally compact unit particularly suited for quick and easy disassembly and assembly.

As will be apparent to persons skilled in the art, various modifications and adaptations of the foregoing specific disclosure can be made without departing from the underlying principles and teachings of the present invention.

I claim:

1. A valve assembly for connection to a fluid supply source and comprising a body having a chamber with ports including an inlet port opening into the chamber, a valve spool axially reciprocable in the chamber to control fluid flow between ports, the valve spool having at one end a relatively enlarged pressure surface area and a relatively reduced pressure surface area at an end opposite said one end, the valve spool having an opening within said opposite end, a sealing subassembly having a series of O ring seals mounted within the chamber between ports to surround the spool and provide perimeter sealing between the spool and the body, a return spring extending into the opening within said opposite end of the valve spool, a bushing surrounding said return spring and said opposite end of the valve spool, end clamping means for maintaining the sealing subassembly and the bushing in abutment within the chamber with the bushing fixed relative to the body between the sealing subassembly and the body, the bushing being of sufficient axial length to surround said opposite end of the spool irrespective of its position within the chamber, and a pilot pressure channel formed in the body communicating the inlet port and the chamber adjacent said opposite end of the spool for continuously applying a return fluid bias thereto.

2. The valve assembly of Claim 1 further including a solenoid actuated pilot valve mounted on the body and having a fluid passage communicating with the chamber for selectively applying fluid pressure to said one end of the spool, the fluid passage additionally being in constant communication with the inlet port for supplying motive fluid under full line supply pressure to the solenoid actuated pilot valve, thereby maximizing fluid operating pressure selectively applied on the opposite ends of the spool.

3. The valve assembly of Claim 1 further including an annular seal of generally C shaped half section fitted about the spool at said one end and opening toward a source of fluid pressure.

4. The valve assembly of Claim 1 wherein the end clamping means includes an end plate removably secured to the body, and wherein spool impact absorbing means is fitted within the bushing between the end plate and the return spring.